(12) United States Patent
Chandrasekaran et al.

(10) Patent No.: US 10,909,010 B2
(45) Date of Patent: Feb. 2, 2021

(54) EFFICIENT DATA RESTORATION

(71) Applicant: Nutanix, Inc., San Jose, CA (US)

(72) Inventors: Karthik Chandrasekaran, Bangalore (IN); Parthasarathy Ramachandran, Palo Alto, CA (US); Pranay Kumar Ega, Nellore District (IN)

(73) Assignee: Nutanix, Inc., San Jose, CA (US)

( * ) Notice: Subject to any disclaimer, the term of this patent is extended or adjusted under 35 U.S.C. 154(b) by 172 days.

(21) Appl. No.: 15/949,886

(22) Filed: Apr. 10, 2018

(65) Prior Publication Data

US 2019/0340091 A1    Nov. 7, 2019

(51) Int. Cl.
*G06F 11/20*   (2006.01)
*G06F 11/14*   (2006.01)
*G06F 9/54*    (2006.01)
*H04L 29/06*   (2006.01)
*H04L 29/08*   (2006.01)

(52) U.S. Cl.
CPC .......... *G06F 11/2094* (2013.01); *G06F 9/547* (2013.01); *G06F 11/1464* (2013.01); *G06F 11/1469* (2013.01); *G06F 2201/82* (2013.01); *H04L 63/02* (2013.01); *H04L 67/10* (2013.01); *H04L 67/42* (2013.01)

(58) Field of Classification Search
CPC combination set(s) only.
See application file for complete search history.

(56) References Cited

U.S. PATENT DOCUMENTS

| | | | |
|---|---|---|---|
| 5,828,833 A | 10/1998 | Belville et al. | |
| 7,313,614 B2* | 12/2007 | Considine | G06F 11/2074 709/217 |
| 7,756,903 B2* | 7/2010 | Kumar | G06F 16/951 707/802 |
| 8,243,588 B2* | 8/2012 | Naseh | H04L 45/04 370/219 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Amine Riad
(74) *Attorney, Agent, or Firm* — Vista IP Law Group, LLP

(57) ABSTRACT

A data center communicates with a cloud-based backup system. Client-server roles are established such that a client role is assigned to the data center and a server role is assigned to the cloud-based backup system. On an ongoing basis, backup operations are performed. In the event of disaster or other cause of an outage of the data center, a failover protocol might be invoked such that the cloud-based backup system takes on additional processing operations beyond the aforementioned backup operations. After remediation, the data center issues a data restoration message to the cloud-based backup system. The remediated data center initiates a failback protocol that reverses the client-server roles of the data center and the cloud-based backup system such that the server role is assigned to the data center and the client role is assigned to the cloud-based backup system. After performing system restoration operations, the roles may be reversed again.

31 Claims, 13 Drawing Sheets

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,021,297 B1* | 4/2015 | Hayes | G06F 11/1666 714/6.3 |
| 9,210,213 B2* | 12/2015 | Momchilov | G06F 3/1454 |
| 9,772,866 B1 | 9/2017 | Aron et al. | |
| 9,930,029 B2 | 3/2018 | Ramachandran et al. | |
| 10,169,173 B2* | 1/2019 | Deng | G06F 11/2007 |
| 2002/0147823 A1* | 10/2002 | Healy | H04L 12/2856 709/230 |
| 2007/0016904 A1 | 1/2007 | Adlung et al. | |
| 2007/0016945 A1 | 1/2007 | Bassett et al. | |
| 2007/0198700 A1* | 8/2007 | Vivian | G06F 11/2097 709/224 |
| 2008/0155208 A1 | 6/2008 | Hiltgen et al. | |
| 2009/0063691 A1 | 3/2009 | Kalofonos et al. | |
| 2009/0125633 A1* | 5/2009 | Watsen | H04L 69/16 709/229 |
| 2009/0222498 A1* | 9/2009 | Lu | G06F 16/10 |
| 2009/0282471 A1 | 11/2009 | Green et al. | |
| 2012/0233668 A1* | 9/2012 | Leafe | G06F 9/44526 726/4 |
| 2012/0310887 A1* | 12/2012 | Taranov | G06F 11/2028 707/634 |
| 2012/0331461 A1 | 12/2012 | Fries et al. | |
| 2013/0132951 A1 | 5/2013 | Shah | |
| 2013/0160024 A1* | 6/2013 | Shtilman | G06F 9/5083 718/105 |
| 2013/0311832 A1 | 11/2013 | Lad et al. | |
| 2014/0359146 A1 | 12/2014 | Metzler et al. | |
| 2015/0150114 A1 | 5/2015 | Kuker et al. | |
| 2016/0021218 A1 | 1/2016 | Smith | |
| 2016/0239396 A1* | 8/2016 | Deng | G06F 11/2007 |
| 2016/0352840 A1 | 12/2016 | Negron et al. | |
| 2017/0034310 A1 | 2/2017 | Victorelli | |
| 2018/0096068 A1* | 4/2018 | Venkataramanappa | G06F 16/2379 |

OTHER PUBLICATIONS

Poitras, Steven. "The Nutanix Bible" (Jan. 11, 2014), from http://stevenpoitras.com/the-nutanix-bible/ Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication late based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

U.S. Appl. No. 15/233,808, filed Aug. 10, 2016, 66 pages.

U.S. Appl. No. 15/936,207, filed Mar. 26, 2018, 44 pages.

Notice of Allowance dated Nov. 14, 2017 for related U.S. Appl. No. 15/053,473.

"How RPC Works". Mar. 28, 2003. 7 pages.

International Search Report and Written Opinion dated May 15, 2017 for corresponding PCT Application No. PCT/US17/19109, 10 pages.

"ISO OSI 7 Layer Model forced with TCP/IP". Aug. 7, 2000. 15 pages.

"How to know at what OSI Layer(s) does a firewall operate". Network Engineering Stack Exchange. Feb. 2, 2018. 2 pages.

"OSI model". Wikipedia. Feb. 2, 2018. 8 pages.

Srinivasan. "RPC: Remote Procedure Call Protocol Specification Version 2". Aug. 1995. 18 pages.

"Transmission Control Protocol". Wikipedia. Feb. 2, 2018. 12 pages.

Notice of Allowance dated Jul. 12, 2018 for related U.S. Appl. No. 15/936,207.

Cano, I. et al., "Curator: Self-Managing Storage for Enterprise Clusters", 14th USENIX Symposium on Networked Systems Design and Implementation, NSDI '17, (Mar. 27, 2017).

\* cited by examiner

EFFICIENT DATA RESTORATION

FIELD

This disclosure relates to computing systems, and more particularly to techniques for efficient data restoration.

BACKGROUND

Modern computing systems often have disaster recovery (DR) capabilities. Specifically, a computing system can implement various data replication functions (e.g., snapshotting, cloning, deduplication, etc.) to support certain DR operations and/or scenarios. For example, if a certain resource (e.g., computing node) of a data center (e.g., an on-premises computing system) fails for any reason such as due to power outage or network outage, etc., a failover migration to a remote computing system (e.g., a cloud-based backup system) can be invoked to bring up the remote computing system in a failover mode. A failback to the data center (e.g., to the on-premises computing system) can be invoked when, for example, the failure mechanism precipitating the failover is remediated, such as when power is restored, network connectivity is restored, etc.

To facilitate the foregoing DR operations, failover operations and failback operations and/or other operations between a data center and a remote computing system, the data center sends DR data (e.g., snapshot data, computing entity clone data, etc.) to the remote computing system on an ongoing basis. In many cases, the data center sends the DR data to the remote computing system on a schedule determined by administrators of the data center. Such schedules are often determined based on various disaster recovery and/or data replication and/or data protection policies (e.g., no more than one hour of data loss is allowed). To send the DR data to the remote computing system, the data center initiates messages (e.g., remote procedure calls or RPCs) to the remote computing system at will, with the expectation that the remote computing system will respond (e.g., receive and process the calls) to such messages in accordance with the content (e.g., payload) of the messages.

In the foregoing data replication scenario, the data center acts the role of an "initiator" and the remote computing system acts in the role of a "responder". Such an initiator/responder relationship serves to move data efficiently, as most of the data traffic goes from the data center (e.g., initiator) to the remote computing system (e.g., responder).

Unfortunately, in a failback restoration scenario, most of the data traffic goes from the remote computing system to the data center. The foregoing initiator and responder roles of the data center and the remote computing system, respectively, becomes no longer efficient for performing the failback restoration operation and/or any other operations where most of the data traffic goes from the remote computing system to the data center.

Such inefficiencies might be exacerbated, for example, as a result of implementation of certain security restrictions (e.g., security restrictions as might be configured into a firewall at the data center), which restrictions prevent the remote computing system from acting as the initiator so as to initiate communications with the data center. In such an environment, the data center, acting in the role of initiator, continuously polls the remote computing system to determine if any data is ready to use in performance of the failback restoration operations. If there is not yet such data available at the remote computing system (e.g., because the remote computing system is in the process of preparing the data for failback) then the CPU cycles and networking bandwidth to perform the ongoing polling are wasted. Worse, when a polling action initiated by the data center determines that there is no data ready yet at the remote computing system, then the data center waits a certain time period (e.g., five seconds, one minute, etc.) and retries the data readiness request. This introduces further inefficiencies since the next retry might also be too early (e.g., because the remote computing system is still in the process of preparing the data for failback). Still worse, the data for failback may be ready for access by the data center well before the next retry by the data center, thus introducing unwanted latency into the failback restoration process.

What is needed is a more efficient way to perform failback operations that restore data to the data center from the remote computing system.

SUMMARY

The present disclosure describes techniques used in systems, methods, and in computer program products for efficient data restoration, which techniques advance the relevant technologies to address technological issues with legacy approaches. More specifically, the present disclosure describes techniques used in systems, methods, and in computer program products for efficient data restoration from a remote computing system. Certain embodiments are directed to technological solutions for establishing, by an on-premises computing system of a data center, a reverse connection resource with a remote computing system that facilitates data restoration operations invoked from the remote computing system.

The disclosed embodiments modify and improve over legacy approaches. In particular, the herein-disclosed techniques provide technical solutions that address the technical problems attendant to efficiently restoring disaster recovery data from a remote computing system. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of distributed storage systems as well as advances in various technical fields related to computing cluster management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
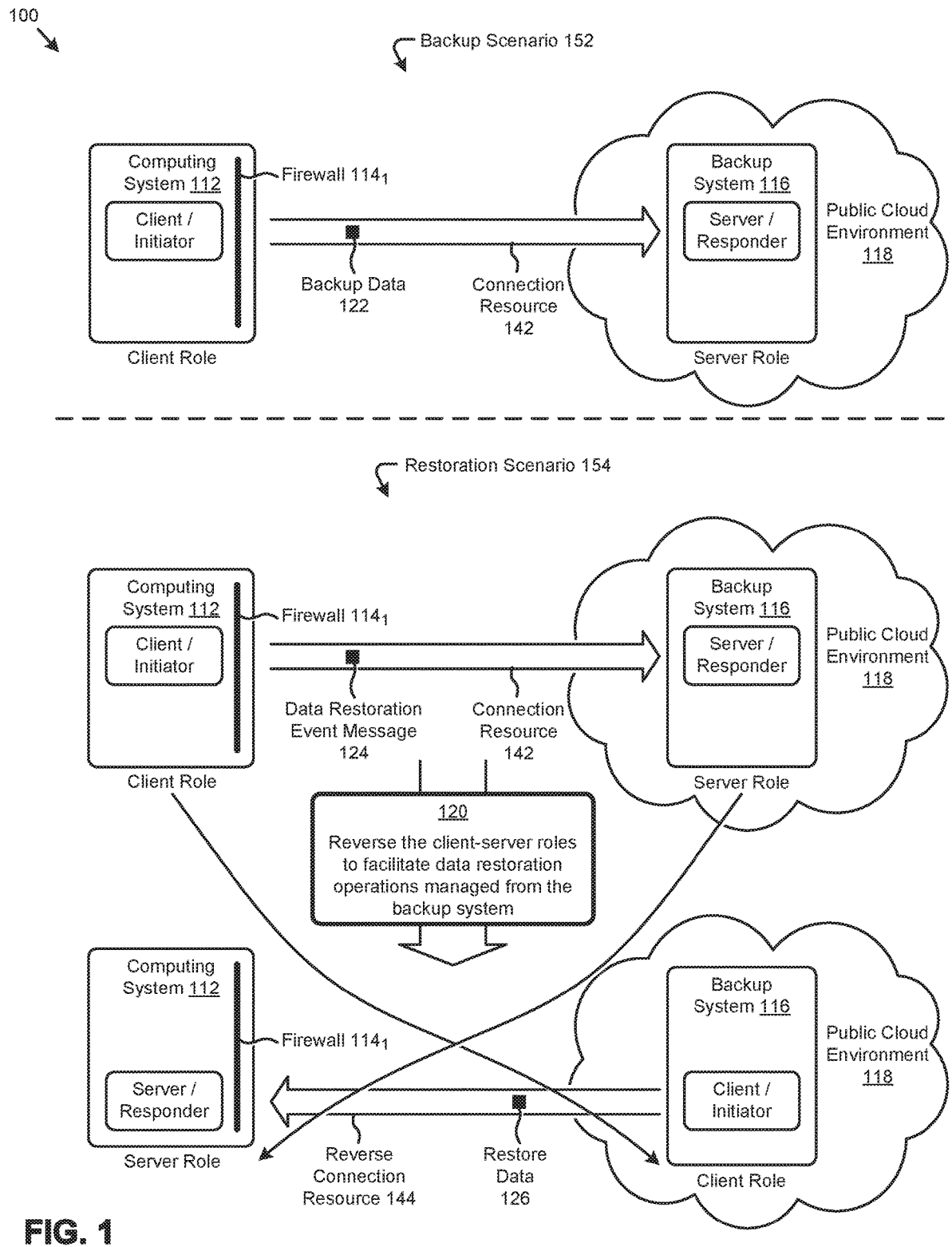
FIG. 1 illustrates a computing environment in which embodiments of the present disclosure can be implemented.

Embodiments in accordance with the present disclosure address the problem of efficiently restoring disaster recovery data from a remote computing system. Some embodiments are directed to approaches for requesting, to the remote computing system, establishment of a reverse connection resource that facilitates data restoration operations invoked from the remote computing system. The accompanying figures and discussions herein present example environments, systems, methods, and computer program products for efficient data restoration from a remote computing system.

Overview

Disclosed herein are techniques for establishing, by an on-premises computing system, a reverse connection resource with a remote computing system that facilitates data restoration operations invoked from the remote computing system. In certain embodiments, the remote computing system is selected to store data (e.g., replication data) that can be used to perform a failback restoration operations and/or other DR operations for the on-premises computing system. A network connection is established by the on-premises computing system to send replication data to the remote computing system. In this case, the on-premises computing system is the initiator (e.g., RPC "client") and the remote computing system is the responder (e.g., RPC "server"). When a failback event is detected, the on-premises computing system initiates a protocol to establish the reverse connection resource.

While established by the on-premises computing system in the role of initiator, the reverse connection resource facilitates communications (e.g., using RPCs) initiated by the remote computing system to the on-premises computing system as if the remote computing system were the initiator (e.g., RPC client) and the on-premises computing system were the responder (e.g., RPC server). Using the reverse connection resource, the remote computing system can initiate the commands (e.g., RPC calls) to carry out the system restoration operations (e.g., data restoration operations, failback operations, on-premises computing system bring-up operations, etc.), in response to a system restoration event (e.g., a data restoration request and/or a failback event). In certain embodiments, the system restoration operations carry out a protocol that includes a transfer of on-premises server information and/or on-premises server access/authentication credentials from the on-premises computing system to the remote computing system. In certain embodiments, the remote computing system is a public cloud-based computing system.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented.

As an option, one or more variations of computing environment 100 or any aspect thereof may be implemented in the context of the architecture and functionality of the embodiments described herein.

FIG. 1 illustrates one aspect pertaining to establishing, by an on-premises computing system, a reverse connection resource with a remote computing system that facilitates data restoration operations invoked from the remote computing system. Specifically, the figure is being presented to illustrate scenarios wherein the herein disclosed techniques address the problems associated with efficiently restoring disaster recovery data from a remote computing system.

Specifically, FIG. 1 illustrates a backup scenario 152 and a restoration scenario 154. In the backup scenario 152, a computing system 112 has identified a backup system 116 to receive a set of backup data 122 to facilitate certain data replication operations (e.g., backup operations). As can be observed, backup system 116 is hosted in a public cloud environment 118, and computing system 112 is protected by a firewall $114_1$. For example, computing system 112 might be a data center that is using a cloud-based disaster recovery (e.g., backup and restore) facility. As such, backup system 116 can be accessed by the general public over the internet, whereas the computing system 112 is protected from such general access.

In this case, a connection resource 142 is established in which the computing system 112 is configured as the client/initiator of the connection, and the backup system 116 is configured as the server/responder of the connection. This assignment of client-server roles facilitates management by the computing system 112 of the backup data 122 sent to the backup system 116. In the backup scenario 152, the foregoing role assignments can be efficient, as most of the data traffic goes from computing system 112 (e.g., client/initiator) to backup system 116 (e.g., server/responder). Unfortunately, in the restoration scenario 154, most of the data traffic goes from backup system 116 to computing system 112, thereby making the foregoing client-server roles of computing system 112 and backup system 116 no longer efficient.

The techniques disclosed herein address such inefficiencies as shown in FIG. 1. Specifically, in restoration scenario 154, the computing system 112 alerts the backup system 116 of a data restoration event by issuing a data restoration event message 124 over connection resource 142. In response to the message, the client-server roles of computing system 112 and backup system 116 are reversed to facilitate data restoration operations that are managed from backup system 116 (operation 120). As a result, a reverse connection resource 144 is established over which various instances of restore data 126 are sent by the backup system 116, which is configured as the client/initiator of the reverse connection resource 144, and received by the computing system 112, which is configured as the server/responder of the reverse connection resource 144.

The techniques disclosed herein provide technical solutions that result in computer functionality improvements. More specifically, such techniques serve to reduce the demand for computer memory, reduce the demand for computer processing power, reduce network bandwidth use, and reduce the demand for inter-component communication. As an example, applying the herein disclosed techniques eliminates the need for computing system 112 to continuously poll the backup system 116 to determine if there are portions of restore data ready to perform failback restoration operations. Elimination of wasteful polling results in better uses of memory, less wasteful CPU processing, as well as conservation of bandwidth and other computing resources at computing system 112. Such resource conservation is further increased in modern computing systems that have numerous instances of a computing system (e.g., data centers, clusters, etc.), any or all of which are using a cloud-based backup and restore facility.

As a further example of the types of inefficiencies that are address by the disclosed techniques, timing differences between such polling at the computing system 112 and data readiness at the backup system 116 can result in a suspension of certain computing resources while they are waiting for a polling action and readiness state to align. Since the suspended resources are not available to any other computing processes at the respective systems, the overall utilization of the computing resources is decreased. A better way is to flip the client/initiator roles such that such potential misalignments that arise in the polling scenario are eliminated.

One embodiment that includes role flipping for efficient data restoration is disclosed in further detail as follows.

Figure 2A:
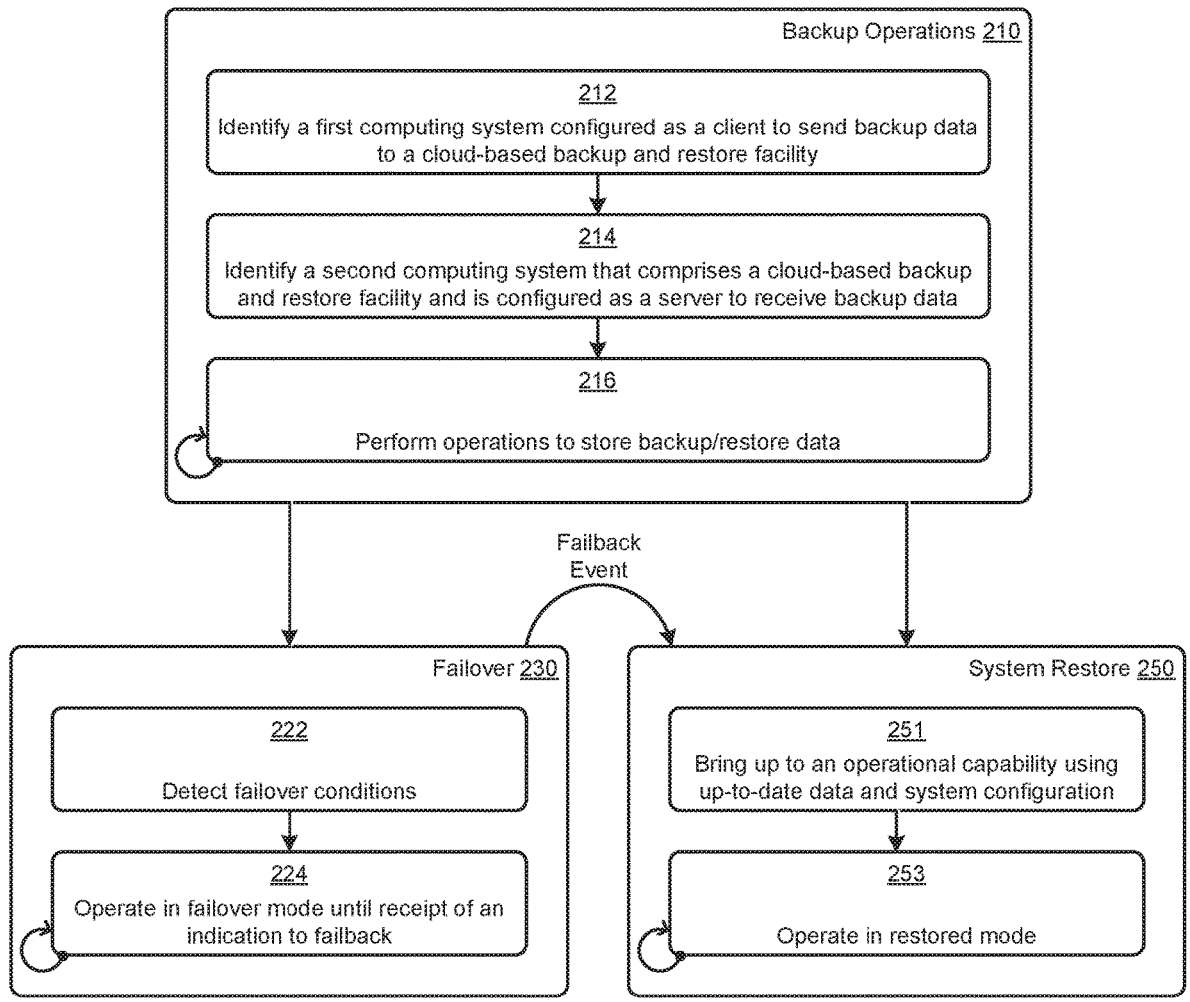
FIG. 2A and FIG. 2B depict backup, failover and failback/restoration techniques as implemented in systems that facilitate efficient data restoration from a remote computing system, according to an embodiment.

FIG. 2A depicts backup, failover and failback/restoration techniques as implemented in systems that facilitate efficient data restoration from a remote computing system. As an option, one or more variations of the shown techniques or any aspect thereof may be implemented in the context of the architecture and functionality of the embodiments described herein. The techniques or any aspect thereof may be implemented in any environment.

FIG. 2A presents one embodiment of certain steps and/or operations that facilitate backup, failover and restore. As shown, a first portion of the figure depicts steps and/or conditions for backup operations 210, a second portion of the figure depicts steps and/or conditions pertaining to failover 230, and a third portion of the figure depicts steps and/or conditions pertaining to system restore 250.

The backup operations 210 can commence by identifying a first computing system that is configured as a client (e.g., that initiates RPCs) to send backup data to a cloud-based backup and restore facility (step 212). The backup operations 210 also include identifying a second computing system that comprises a cloud-based backup and restore facility and is configured as a server (e.g., that receives RPCs) to receive backup data (step 214). Backup operations (e.g., in accordance with a backup protocol) are performed to, at least in part, store backup data at a safe location for later access (step 216). For example, in a DR scenario, the first computing system might perform backup operations by sending data to and issuing RPCs for execution by the second computing system. As another example, in a failback scenario, operations are performed to move previously stored backup data that had been safely stored at one system to another system that is to be restored.

Continuing this discussion, it can happen that the first computing system suffers a failure and/or that communications between the first computing system and the second computing system suffers a failure. In any such cases, a failover event occurs. Detection of such a failover event and entry into a failover mode by the second computing system can be performed by an agent on the second computing system. For example (at step 222), a watchdog timer on the second computing system detects that communications with the first computing system are not possible at that moment in time. As such, and in accordance with failover rules, the second computing system initiates operation in a failover mode (at step 224). Users who were affected by those occurrences (e.g., loss of power, loss of network service, etc.) such as were detected by the watchdog timer can switch over to the second computing system to regain access to data and functionality. Since the configuration of the second computing system includes the most recent or substantially most recent data from the first computing system as well as backup images of the virtual machines that were operating on the first computing system, the users can switch over to access virtual machines on the second computing system and continue work.

As shown, operation in a failover mode can continue for any amount of time. At some point, however, the occurrences (e.g., loss of power, loss of network service, etc.) that were detected by the watchdog timer can be remediated, and the first computing system (or a substitute) and/or communication facilities (or a substitute) can come back online such that normal ongoing communications between the first computing system and the second computing system can again be carried out. When the first computing system (or substitute) determines that it is operational, the first computing system (or substitute) sends a message to the second computing system to indicate such readiness to begin restoration of data and failback. Such an occurrence (e.g., a failback event such as a readiness indication) is depicted by the failback transition from failover 230 to system restore 250. Activities that accomplish system restore 250 include step 251 to bring up a system with restore data and operational configurations. Also, step 253 indicates ongoing operation on restored data and/or configuration. In some cases, at a first moment in time, only some portions of a system are restored and ready for ongoing operation on corresponding restored data. At a second moment in time, other portions of a system are restored and ready for ongoing operation on corresponding restored data. The first portion and the second portion can be brought up to operational readiness asynchronously.

Readiness to enter restore operations can be raised using any known technique. Strictly as examples, readiness can be determined by a monitoring and communication reestablishment protocol carried out by the first computing system and the second computing system, and/or by mere messaging from the first computing system to the second computing system when the first computing system is ready, and/or by mere detection of the presence of conditions that are deemed to indicate readiness for both systems to carry out failback-oriented operations to establish high-performance communications and then enter a data restoration mode, where the first computing system (e.g., the on-premises system) is brought up to full operational capability. However, as earlier indicated, a reverse connection resource is needed to accommodate the respective roles of the first computing system and the second computing system. One mechanism for role flipping and establishment of a reverse connection resource is shown and discussed as pertains to FIG. 2B.

Figure 2B:
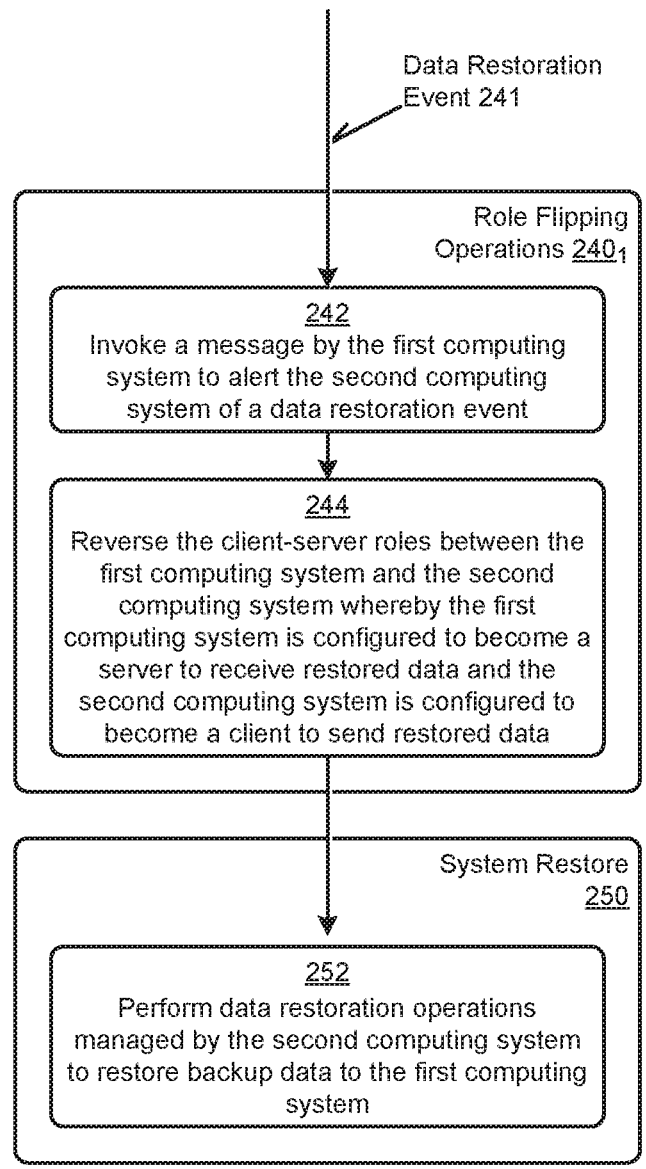

FIG. 2B presents one embodiment of certain steps and/or operations that facilitate establishing a reverse connection resource with a remote computing system that in turn facilitates high-performance data restoration operations invoked from the remote computing system.

As shown, the steps and/or operations commence upon occurrence of a data restoration event 241. Responsive to such an event and/or readiness, and/or responsive to occurrence of a data restoration message or other indication that might accompany data restoration event 241, role flipping operations $240_1$ commence. A messaging sequence to indicate role flipping is initiated by the first computing system. Such a message alerts the second computing system as to the first computing system's readiness to initiate failback (step 242).

In a failback mode, at least for some period of time, the second computing system is in a state of readiness to orchestrate the restoration. Because of this, at step 244, the client-server roles of the first computing system and the second computing system become reversed, where the first computing system becomes configured to carry out communication protocols in a role as a server (e.g., to receive restore data) and the second computing system becomes configured to carry out communication protocols in a role as a client (e.g., to send restore data). The foregoing role reversal facilitates, at least in part, efficient execution of data restoration operations that are managed by the second computing system to restore backup data to the first computing system (step 252). For example, the second computing system might perform such data restoration operations by issuing RPCs to the first computing system. For example, when restoration data becomes available at the second computing system, the intended recipient of the RPCs at the first computing system receives the issued remote procedure commands, together with any restoration data and uses the restoration data to populate storage areas of the first computing system. As such, due to the performance of operations corresponding the issued RPCs, the first computing system becomes 'restored'. At some point, the first computing system is deemed to have been restored. The first computing system initiates a failback cutover signal to the second computing system.

One embodiment of a system for implementing the foregoing system restoration technique and/or for implementing other of the herein disclosed techniques is disclosed as follows.

Figure 3A:
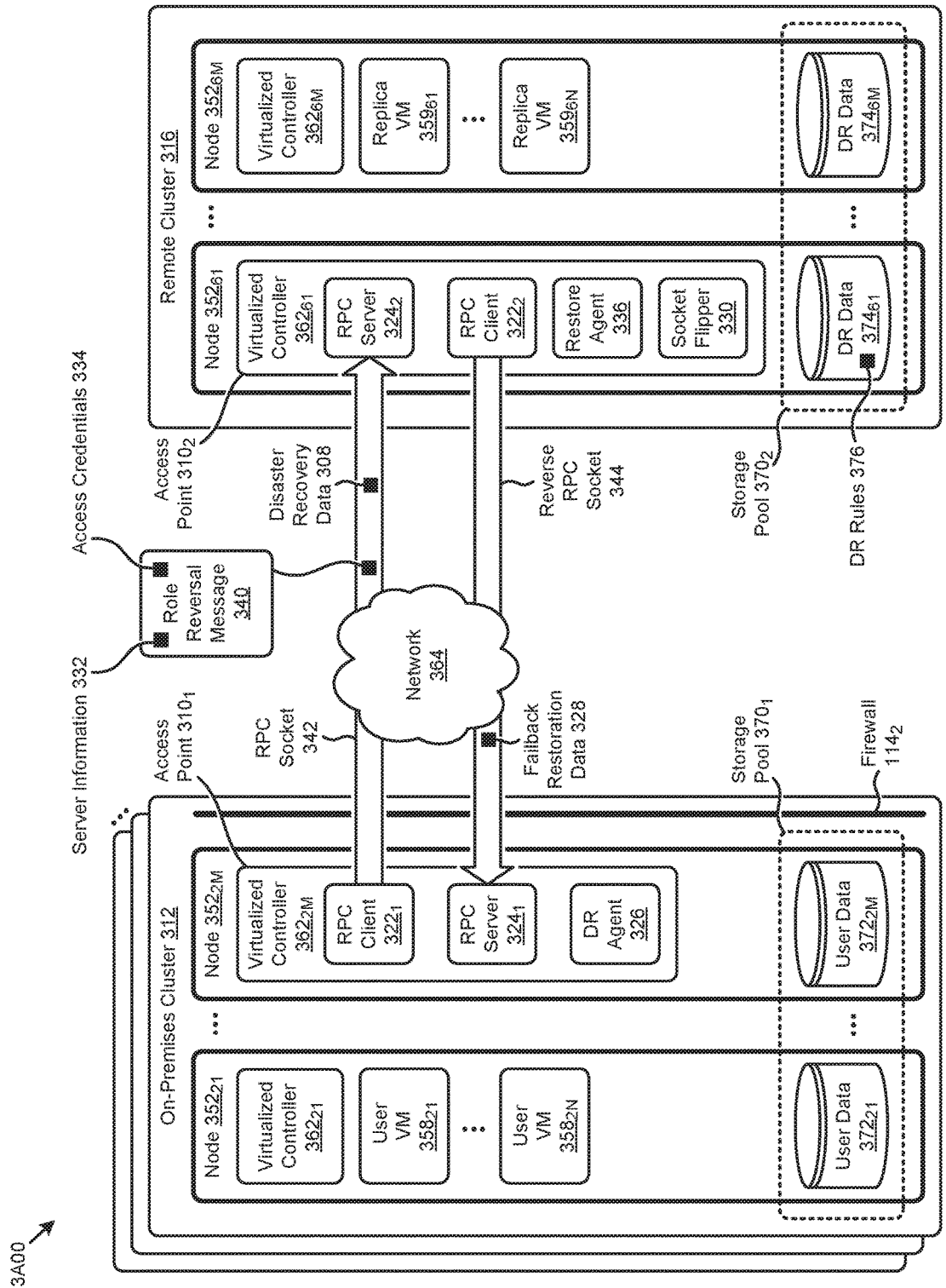
FIG. 3A presents a block diagram of a system for efficient data restoration from a remote computing system, according to an embodiment.

FIG. 3A presents a block diagram 3A00 of a system for efficient data restoration from a remote computing system. As an option, one or more variations of block diagram 3A00 or any aspect thereof may be implemented in the context of the architecture and functionality of the embodiments described herein. The block diagram 3A00 or any aspect thereof may be implemented in any environment.

FIG. 3A illustrates one aspect pertaining to establishing, by an on-premises computing system, a reverse connection resource with a remote computing system that facilitates data restoration operations invoked from the remote computing system. Specifically, the figure is being presented to show one embodiment of the components and associated data flows that facilitate efficiently restoring disaster recovery data from a remote computing system. The components and data flows shown in FIG. 3A present one partitioning and associated data manipulation approach. The specific example shown is purely exemplary, and other subsystems, data structures, and/or partitionings are reasonable.

Specifically, the system of FIG. 3A comprises multiple on-premises computing clusters (e.g., on-premises cluster 312, etc.) comprising multiple nodes that have various storage facilities in a storage pool. Representative nodes (e.g., node $352_{21}$, ..., node $352_{2M}$) and storage pool $370_1$ associated with on-premises cluster 312 are shown. A remote cluster 316 comprising multiple nodes (e.g., node $352_{61}$, ..., node $352_{6M}$) and a storage pool $370_2$ is also shown. In the system of FIG. 3A, the remote cluster 316 serves as a disaster recovery (e.g., backup and restore) facility for the on-premises clusters. Specifically, remote cluster 316 provides disaster recovery services for the virtual machines (VMs) and associated data at on-premises cluster 312. For example, remote cluster 316 might provide backup and restore services for the user VMs (e.g., user VM $358_{21}$, ..., user VM $358_{2N}$) and/or user data (e.g., user data $372_{21}$, ..., user data $372_{2M}$) of on-premises cluster 312.

Such backup and restore services are facilitated at least in part by replica VMs (e.g., replica VM $359_{61}$, ..., replica VM $359_{6N}$) and/or disaster recovery data (e.g., DR data $374_{61}$, ..., DR data $374_{6M}$) at remote cluster 316. For example, one or more of the replica VMs at remote cluster 316 may be spawned in response to a failure (e.g., due to a failure of node $352_{21}$) of a respective one or more of the user VMs at on-premises cluster 312. A portion of the DR data (e.g., user VM snapshots) at remote cluster 316 can be accessed to facilitate the spawning of the replica VMs.

The nodes of the on-premises cluster 312 and the remote cluster 316 comprise respective instances of a system controller, which are implemented as virtualized controllers (e.g., virtualized controller $362_{21}$, ..., virtualized controller $362_{2M}$, and virtualized controller $362_{61}$, ..., virtualized controller $362_{6M}$). The virtualized controllers are implemented at least in part to facilitate access to the cluster storage pools by the VMs (e.g., user VMs, replica VMs, etc.) and/or other virtualized entities (e.g., executable containers, etc.) and/or other computing processes. At least one virtualized controller is often designated (e.g., configured as, or elected by peer virtualized controllers) as the access point for the cluster. For example, virtualized controller $362_{2M}$ is elected as access point $310_1$ for the on-premises cluster 312, and virtualized controller $362_{61}$ is elected as access point $310_2$ for the remote cluster 316. One function of the access point is to facilitate inter-cluster communications.

Further details regarding general approaches to establishing secure connections between computing systems are described in U.S. Pat. No. 9,930,029 titled "HYPERVISOR AGNOSTIC BIDIRECTIONAL SECURE CHANNEL FOR GUEST AGENT TRANSPORT", issued on Mar. 27, 2018, which is hereby incorporated by reference in its entirety.

Further details regarding general approaches to establishing secure connections between computing systems are described in U.S. patent application Ser. No. 15/936,207 titled "HYPERVISOR AGNOSTIC BIDIRECTIONAL SECURE CHANNEL FOR GUEST AGENT TRANSPORT", filed on Mar. 26, 2018, which is hereby incorporated by reference in its entirety.

Such inter-cluster communications might be used in disaster recovery operations. However, available inter-cluster communication techniques can be constrained by certain aspects of the computing environment. For example, a firewall $114_2$ associated with on-premises cluster 312 might limit access to the on-premises cluster 312 from a network 364 (e.g., the Internet). Given this constraint, a remote procedure call (RPC) socket (e.g., RPC socket 342) is established by on-premises cluster 312 to send the disaster recovery data 308 to remote cluster 316. As can be observed, an RPC client $322_1$ at the on-premises cluster 312 (e.g., at virtualized controller $362_{2M}$) issues RPCs to an RPC server $324_2$ at the remote cluster 316 (e.g., at virtualized controller $362_{61}$) to send the disaster recovery data 308. An instance of a DR agent 326 at virtualized controller $362_{2M}$ might manage the transmission of such data (e.g., what data to send, when that data is to be sent, etc.) from the on-premises cluster 312 to the remote cluster 316. Additionally, a set of default migration and/or failover mode bring-up instructions might be stored at the remote cluster 316 so as to be prepared for the occurrence of an event that would cause the remote cluster 316 to enter into a failover mode. As earlier indicated, operation in a failover mode can continue for any amount of time, at least until the on-premises cluster 312 signals readiness to failback. In some disaster recovery scenarios, another cluster, possibly in a different geography is configured to take on the role or roles formerly held by the on-premises cluster 312. This can happen for example, if a disaster in a first geographic area prevents rapid remediation. In such as case, another cluster, possibly in a second geographic area is configured to take on the role or roles formerly held by the on-premises cluster 312 of the first geographic area.

Upon detection of a failback restoration event, certain failback operations are to be performed. In this case, the majority of the data traffic will be from the remote cluster 316 to the on-premises cluster 312, making the RPC socket 342 comprising the RPC client $322_1$ and the RPC server $324_2$ inefficient. As can be observed in the embodiment of FIG. 3A, the herein disclosed addresses this inefficiency at least in part by a role reversal message 340 or other role reversal indication that is issued from the on-premises cluster 312 to the remote cluster 316. In some cases, the role reversal message 340 is issued in response to a failback restoration event (e.g., a failed node is back online) detected by the on-premises cluster 312 or the remote cluster 316. The content of the role reversal message 340 might comprise, a set of event information, a set of server information 332, a set of access credentials 334, and/or other information. For example, the server information 332 might include various parameters (e.g., a uniform resource identifier (URI), etc.) of an RPC server implemented at the access point of the then-current RPC client. Specifically, the server information 332 might describe an RPC server $324_1$ at access point $310_1$ of on-premises cluster 312. The access credentials 334 might include various information (e.g., tokens, keys, certificates, usernames, passwords, etc.) to facilitate access to the RPC server that is named or otherwise characterized in the server information 332. Of the role reversal message 340.

Using the access credentials 334, an RPC client $322_2$ at remote cluster 316 can establish a reverse RPC socket 344 to send the failback restoration data 328 to the on-premises cluster 312. Specifically, the access credentials are used to authorize the RPC client $322_2$ to send RPCs and/or other messages over the reverse RPC socket 344. As shown, a socket flipper 330 can process the received instances of server information 332 and access credentials 334 to establish and/or use the reverse RPC socket 344. An instance of a restore agent 336 at virtualized controller $362_{61}$ can manage the transmission of the failback restoration data 328 (e.g., what data to send, when that data is to be sent, etc.) from the remote cluster 316 to the on-premises cluster 312. In some cases, the restore agent 336 might access a set of DR rules 376 in storage pool $370_2$ to facilitate management of the failback restoration operations.

A set of scenarios that further depict the herein disclosed techniques as implemented in the computing environment of FIG. 3A are disclosed as follows.

Figure 3B:
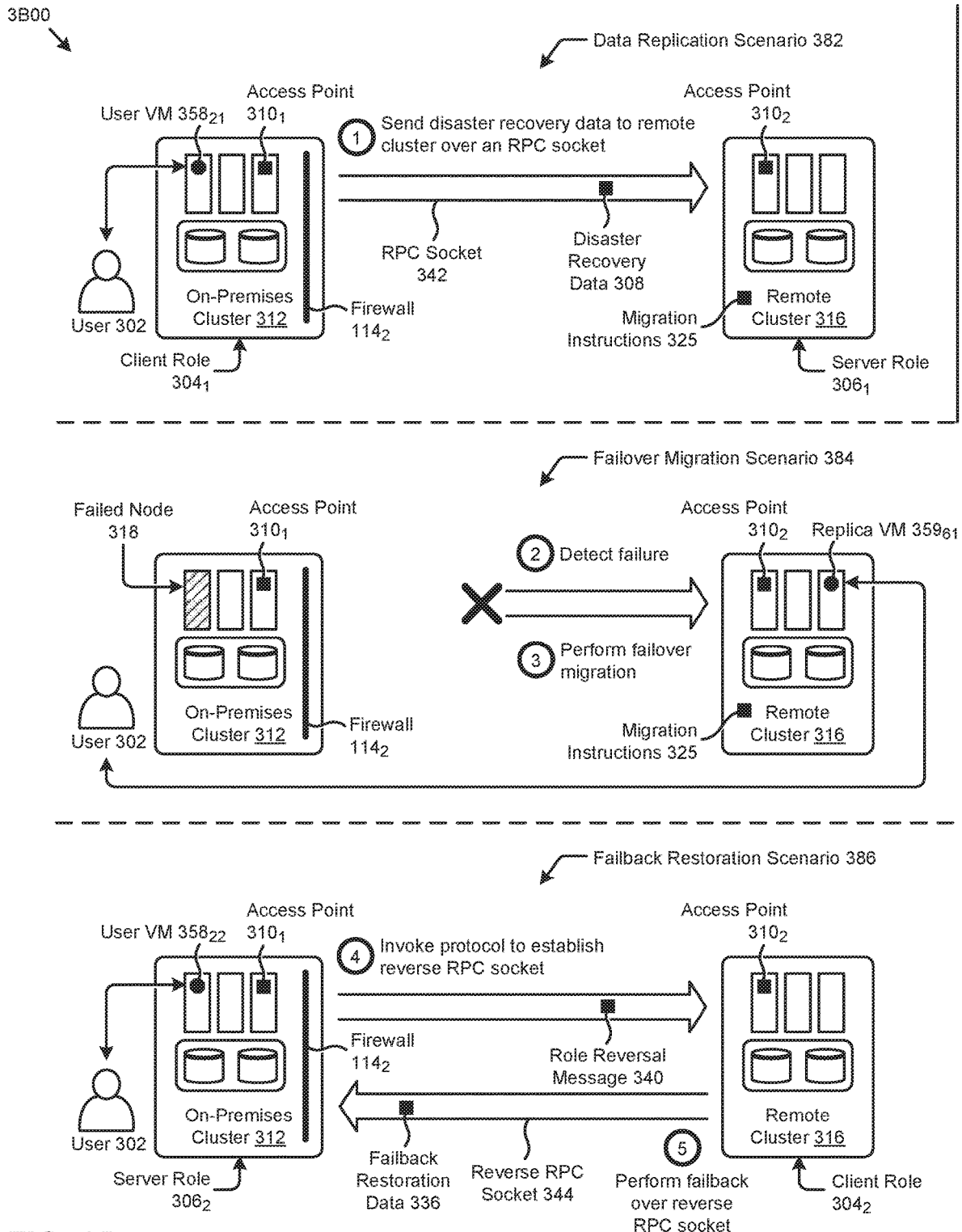
FIG. 3B illustrates a disaster recovery scenario as is addressed by systems that facilitate efficient data restoration from a remote computing system, according to an embodiment.

FIG. 3B illustrates a disaster recovery scenario 3B00 as is addressed by systems that facilitate efficient data restoration from a remote computing system. As an option, one or more variations of disaster recovery scenario 3B00 or any aspect thereof may be implemented in the context of the architecture and functionality of the embodiments described herein. The disaster recovery scenario 3B00 or any aspect thereof may be implemented in any environment.

FIG. 3B illustrates one aspect pertaining to establishing, by an on-premises computing system, a reverse connection resource with a remote computing system that facilitates data restoration operations invoked from the remote computing system. Specifically, the figure is being presented to illustrate an embodiment of the herein disclosed techniques that facilitates a data replication scenario 382, a failover migration scenario 384, and a failback restoration scenario 386, as implemented in the computing environment earlier described as pertains to FIG. 3A.

As shown in data replication scenario 382, the on-premises cluster 312, operating in a client role $304_1$, sends the disaster recovery data 308 to the remote cluster 316 that is operating in a server role $306_1$ (operation 1). An RPC socket 342 from access point $310_1$ of the on-premises cluster 312 through firewall $114_2$ to access point $310_2$ of remote cluster 316 is used to transmit (e.g., in RPCs) the disaster recovery data 308. At least some of the DR data pertains to a user VM $358_{21}$ running at the on-premises cluster 312, and operated by a user 302.

In the failover migration scenario 384, a node failure or other failure is detected (operation 2). For example, a failed node 318 might correspond to the node hosting the VM of user 302. Responsive to the detected failure, a failover migration is performed to enter into a failover mode and, as in this example, launch replica VMs (e.g., VM $359_{61}$) at the remote cluster 316 so that users (e.g., user 302) can continue working (operation 3). Such failover migration operations are facilitated by the aforementioned migration instructions 325 that are stored by use by processes or agents (e.g., access point $310_2$) of remote cluster 316. In some cases, if the aforementioned processes or agents of a cluster suffer a failure, new processes or agents will be elected.

Referring to failback restoration scenario 386, at some point, on-premises cluster 312 becomes ready to perform data restoration operations. According to the herein disclosed techniques, the failback restoration can be initiated by invoking, by the on-premises cluster 312, a protocol to establish a reverse RPC socket (operation 4). Specifically, the on-premises cluster 312 might issue a role reversal message 340 to the remote cluster 316 to invoke the protocol. Using information in the role reversal message 340, a reverse RPC socket 344 is established to perform the failback restoration (operation 5). In this case, the remote cluster 316, operating in a client role $304_2$, sends the failback restoration data 328 to the on-premises cluster 312 that is operating in a server role $306_2$. At least some of the failback restoration data 328 facilitates the launch of a new instance of user VM $358_{22}$ at the on-premises cluster 312 for user 302.

The foregoing discussion of FIG. 3B includes a reference to a protocol for establishing a reverse RPC socket, which is disclosed in further detail as follows.

Figure 4A:
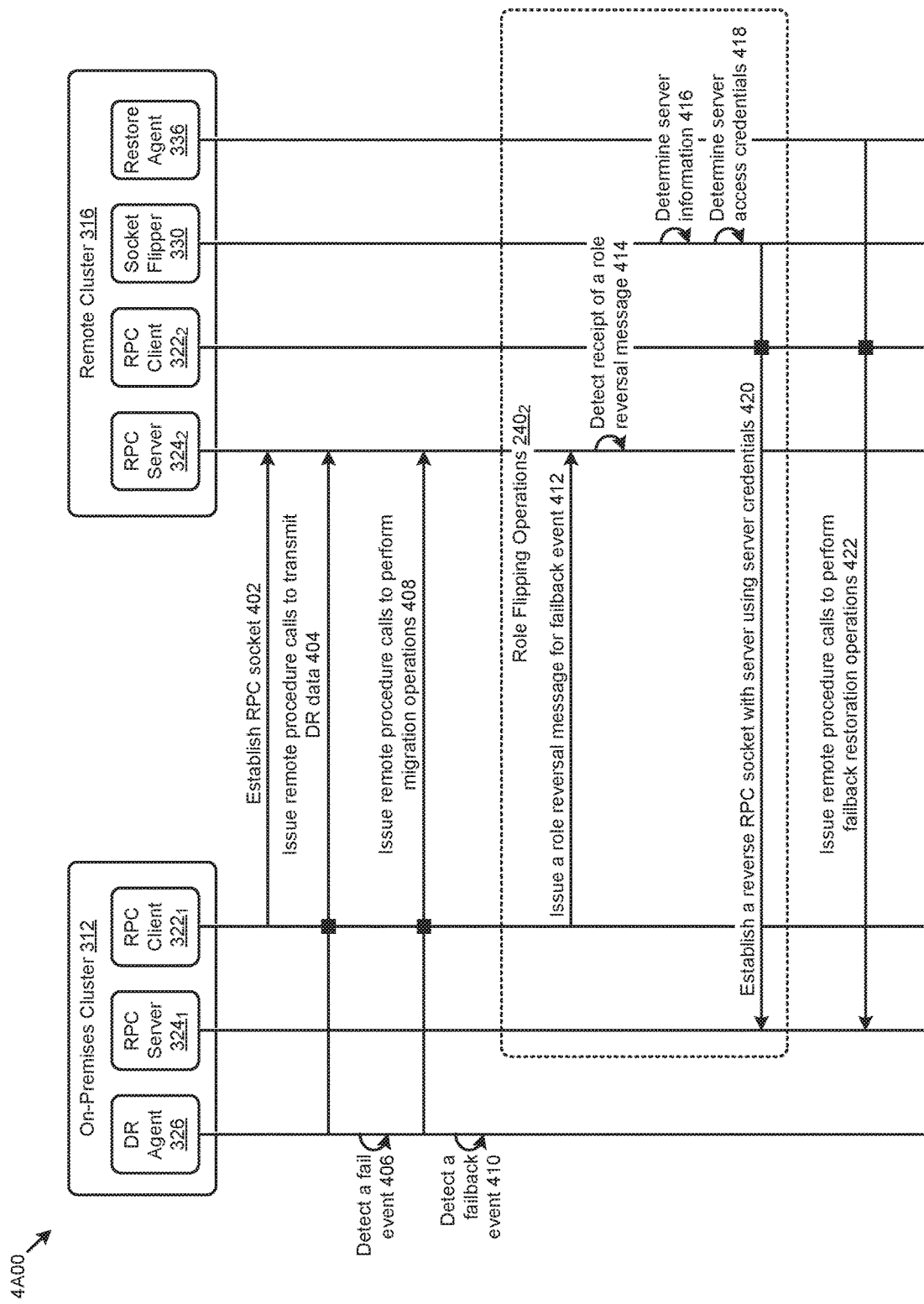
FIG. 4A presents a reverse connection resource setup protocol as implemented in systems that facilitate efficient data restoration from a remote computing system, according to some embodiments.

FIG. 4A presents a reverse connection resource setup protocol 4A00 as implemented in systems that facilitate efficient data restoration from a remote computing system. As an option, one or more variations of reverse connection resource setup protocol 4A00 or any aspect thereof may be implemented in the context of the architecture and functionality of the embodiments described herein. The reverse connection resource setup protocol 4A00 or any aspect thereof may be implemented in any environment.

FIG. 4A illustrates one aspect pertaining to establishing, by an on-premises computing system, a reverse connection resource with a remote computing system that facilitates data restoration operations invoked from the remote computing system. Specifically, the figure is being presented with respect to its contribution to techniques for establishing the aforementioned reverse connection resource (e.g., reverse RPC socket).

The reverse connection resource setup protocol 4A00 shown in FIG. 4A depicts various computing system components earlier described that can exhibit a set of high order interactions (e.g., operations, messages, etc.) that establish and/or use the reverse connection resource. Specifically shown are the on-premises cluster 312 with certain representative instances of its components (e.g., RPC client $322_1$, RPC server $324_1$, and DR agent 326), and the remote cluster 316 with certain representative instances of its components (e.g., RPC server $324_2$, RPC client $322_2$, socket flipper 330, and restore agent 336). As earlier presented, remote cluster 316 is identified to serve as a disaster recovery (e.g., backup and restore) facility for on-premises cluster 312.

The reverse connection resource setup protocol 4A00 can commence with the RPC client $322_1$ at the on-premises cluster 312 establishing an RPC socket with the RPC server $324_2$ at the remote cluster 316 (message 402). Remote procedure calls that transmit DR data are issued from DR agent 326 through RPC client $322_1$ to RPC server $324_2$ (message 404). At some later time, a fail event (e.g., node failure, rack failure, etc.) is detected at DR agent 326 (operation 406). In some cases, failover might occur even in absence of a total failure of the on-premises cluster 312. For example, a partial failover might involve failover of only one node or some number of nodes of the on-premises cluster 312. In such cases, in response to the partial fail event, remote procedure calls to perform migration operations are issued from the on-premises cluster 312 to the remote cluster 316 (message 408).

When a failback event (e.g., a failed node is recovered) is detected (operation 410), a set of role flipping operations $240_2$ are invoked. The role flipping operations $240_2$ can commence with a role reversal message being issued from RPC client $322_1$ at on-premises cluster 312 to RPC server $324_2$ at remote cluster 316 (message 412). The RPC server $324_2$ detects that a role reversal message is received (operation 414). By detecting that the received message pertains to role reversal, certain processing of the message is invoked. Specifically, the socket flipper 330 can determine a set of server information associated with the message (operation 416) and/or determine the server access credentials for the server identified in the message (operation 418). Using the server information and/or the server access credentials, a reverse RPC socket is established (message 420). In this case, socket flipper 330, through RPC client $322_2$ at the remote cluster 316 establishes the reverse RPC socket with the RPC server $324_1$ at the on-premises cluster 312. With the reverse RPC socket established, remote procedure calls to perform various failback restoration operations are issued from restore agent 336 through RPC client $322_2$ to RPC server $324_1$ (message 422).

Figure 4B:
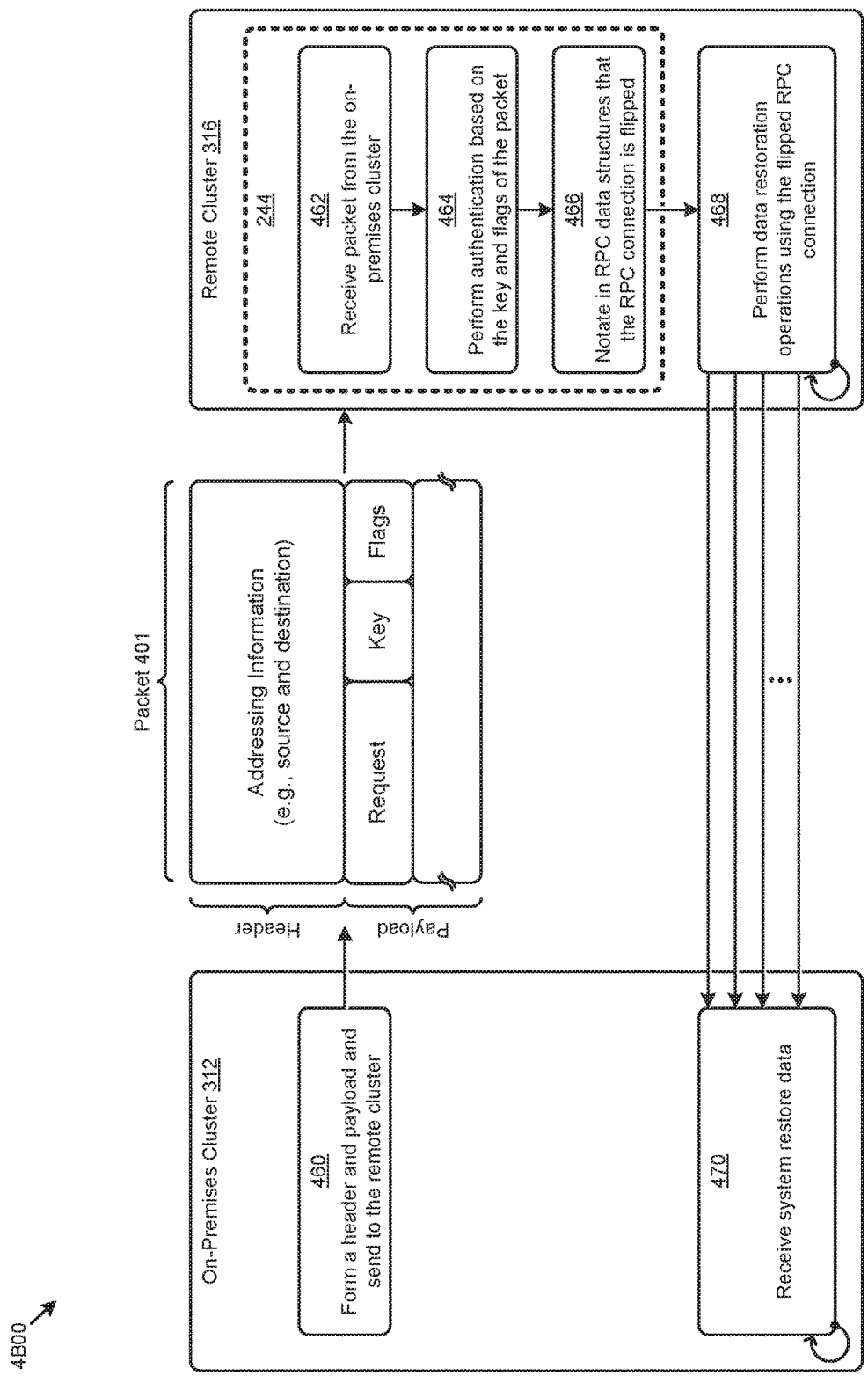
FIG. 4B presents a reverse connection resource setup flow as implemented in systems that facilitate efficient data restoration from a remote computing system, according to some embodiments.

FIG. 4B presents a reverse connection resource setup flow 4B00 as implemented in systems that facilitate efficient data restoration from a remote computing system, according to some embodiments. More specifically, the reverse connection resource setup flow 4B00 serves to establish a reverse RPC socket that is used after role flipping.

As shown, the role flipping operations $240_2$, carried out during operation of the protocol of FIG. 4A serves to establish role-flipped RPC communications between the on-premises cluster and the remote cluster. As is known in the art, the RPC process is initiated by a client, thus, the remote cluster which has hitherto been operating as a server, now needs to operate as a client; at least for performing communications with the on-premises cluster over the RPC socket. To accomplish this, in situations such as a failback scenario, the on-premises cluster instructs the remote cluster to take on the role of a client. Step 460 provide one possibility for instructing the remote cluster. As shown, the on-premises cluster forms a packet 401 comprising header and payload. The payload includes a request to the remote server to flip its role so as to establish an RPC socket that refers to the requesting on-premises system. At step 462, the packet is received by an agent of the remote cluster. In many cases, and as shown at step 464, the remote cluster uses information from the packet (e.g., the key) to perform authentication of the sender. In other cases, the remote cluster uses an authentication credential provided by the on-premises cluster to perform authentication. In still other cases, the remote cluster uses information from the packet and other information (e.g., server information) that had been earlier provided by the on-premises cluster so as to initiate self-signing certificate generation and authentication. One or more additional protocols may be carried out to accomplish self-signing certificate generation and authentication.

In the specific scenario of failback, and in order to use the RPC facility for remote procedure calls that are to be carried out by the on-premises cluster, the role of the remote cluster needs to be flipped from its hitherto role as a client to take on a role as a server. In parallel, in the specific scenario of failback, the role of the on-premises cluster needs to be flipped from its role as a server to take on a role as a client.

To accomplish this, at step 466 the flipping is initiated by the on-premises cluster when the on-premises cluster sends commands that are formatted into the payload portion of an IP packet (e.g., packet 401). More specifically, the semantics of the command of the packet 401 instructs an agent of the remote cluster "flip" the sense of the connection. Still more specifically, the agent of the remote cluster notates or otherwise indicates in data structures of the remote cluster that an RPC socket connection should be established between the on-premises cluster and the cloud cluster. The data structures are notated to indicate that the RPC socket connection should be used for remote procedure calls from the cloud cluster to the on-premises cluster. In this embodiment, changes are made in the RPC layer so that an existing TCP connection can be used for remote process calls.

Once the data structures are notated, the agent of the remote cluster then carries out RPC setup in accordance with networking standards. Specifically, the client agent of the remote cluster calls a local stub procedure that refers to the procedure to be run on the on-premises side. The client stub code called by the agent of the remote cluster retrieves the required parameters from its address space. In some cases, and as shown the remote cluster has sufficient information to authenticate the request. Further, the on-premises cluster may have included a key and flags in the packet 401 such that the remote cluster can authenticate the sender.

At step 468, the flipped RPC facilities are used to carry out restoration operations (step 470) with the restoration agents of the on-premises cluster. Additionally, the flipped RPC facilities can provide context multiplexing for connection-oriented connections (e.g., connections that use Transmission Control Protocol (TCP)). This allows negotiation of multiple security contexts over a single connection.

The foregoing discussions of FIG. 4A and FIG. 4B include references to failback restoration operations managed from a remote cluster over a reverse connection resource (e.g., reverse RPC socket). A particular failback restoration technique is disclosed in further detail as follows.

Figure 5:
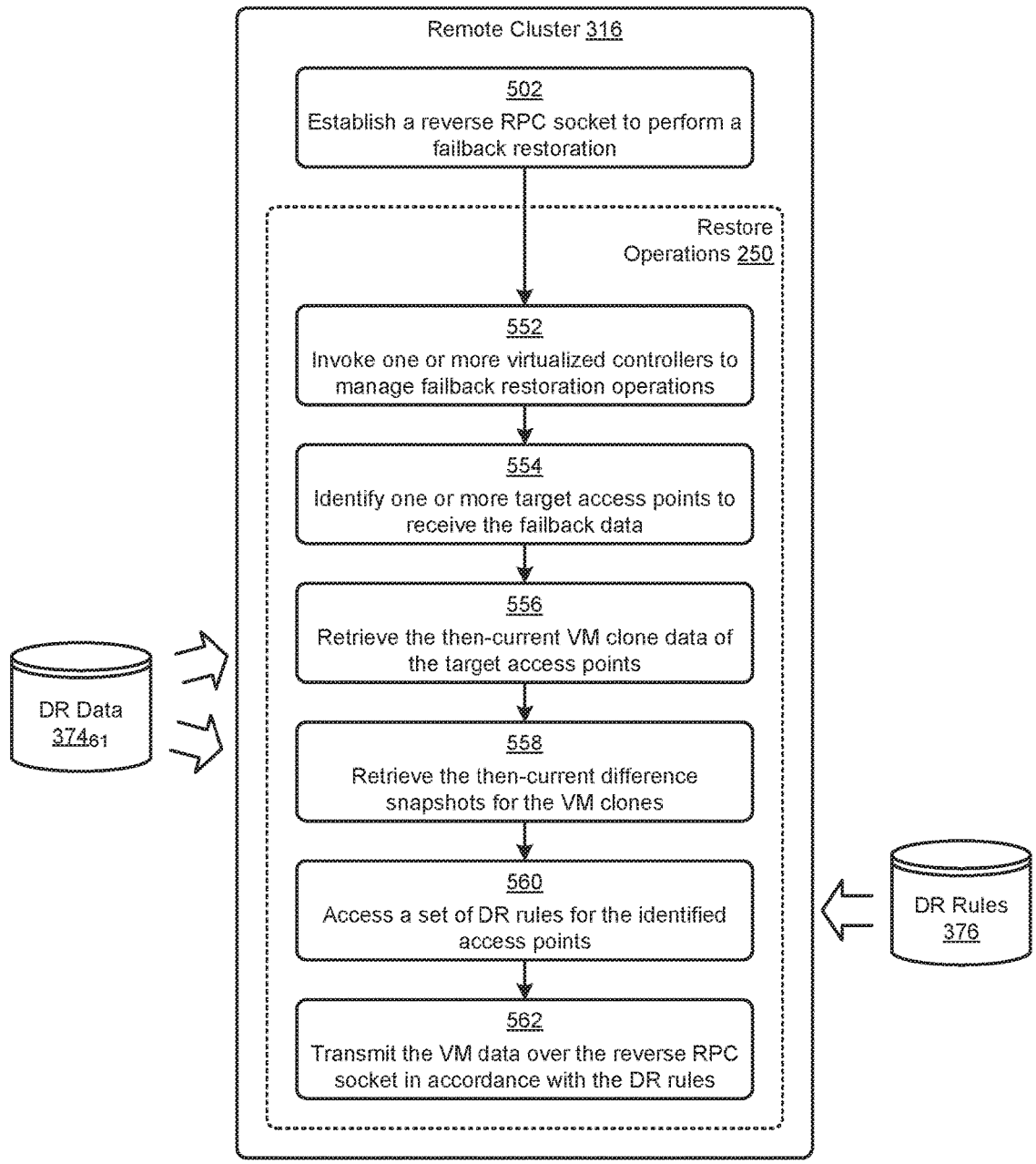
FIG. 5 depicts a failback restoration technique as implemented in systems that facilitate efficient data restoration from a remote computing system, according to an embodiment.

FIG. 5 depicts a failback restoration technique 500 as implemented in systems that facilitate efficient data restoration from a remote computing system. As an option, one or more variations of failback restoration technique 500 or any aspect thereof may be implemented in the context of the architecture and functionality of the embodiments described herein. The failback restoration technique 500 or any aspect thereof may be implemented in any environment.

FIG. 5 illustrates one aspect pertaining to establishing, by an on-premises computing system, a reverse connection resource with a remote computing system that facilitates data restoration operations invoked from the remote computing system. Specifically, the figure is being presented to depict an embodiment of certain steps and/or operations that perform failback restoration operations over the reverse connection resource (e.g., reverse RPC socket).

As shown in failback restoration technique 500, a portion of the steps and/or operations comprise all or some operations pertaining to system restore 250 as earlier described as pertains to FIG. 2A and FIG. 2B. Also, in certain embodiments, the steps and/or operations can be performed at remote cluster 316 as described herein. The failback restoration technique 500 commence at step 502 by establishing a reverse RPC socket (e.g., according to the herein disclosed techniques) to perform a failback restoration. One or more virtualized controllers (e.g., at remote cluster 316) are brought up to manage the failback restoration operations (step 552). The virtualized controller might, for example, serve as the access point for remote cluster 316 and also might serve as the RPC client for communicating with a target failback cluster over the reverse RPC socket. As such, the target access point or points (e.g., at the target failback cluster) are identified to receive the failback data (step 554). In some cases, the target access points may be unknown by the remote cluster 316. In such cases newly-designated target access points are established by the target cluster, and the remote cluster is advised of the existence and readiness of the designated target access points. In some cases, the target access points might be determined based at least in part on the portion of the cluster that is to receive the failback restoration data. Such a scenario can occur when one cluster hosts multiple tenants, and each tenant space is logically "walled off" from other tenant spaces.

The then-current VM clone data for the target access points is retrieved (step 556), at which point then-current difference snapshots of the VM clones are also retrieved (step 558). The snapshots of the VM clones and/or the retrieval mechanisms can be performed using any known techniques.

Further details regarding general approaches to managing snapshots of VM clones are described in U.S. application Ser. No. 15/233,808 titled "AUTOMATIC APPLICATION MIGRATION ACROSS VIRTUALIZATION ENVIRONMENTS", filed on Aug. 10, 2016, which is hereby incorporated by reference in its entirety.

As shown, such VM clone data and/or snapshot data might be retrieved from the DR data (e.g., DR data $374_{61}$) accessible at remote cluster 316. A set of DR rules (e.g., DR rules 376) pertaining to the identified access points are also accessed (step 560). The VM data (e.g., clone and snapshot data) are then transmitted over the reverse RPC socket in accordance with the DR rules (step 562). For example, the DR rules 376 might prioritize recovery of the engineering department's VMs over the finance department's VMs so as to affect the order in which the respective data for those VMs is transmitted from remote cluster 316 to the target access points.

Additional Embodiments of the Disclosure

Additional Practical Application Examples

Figure 6A:
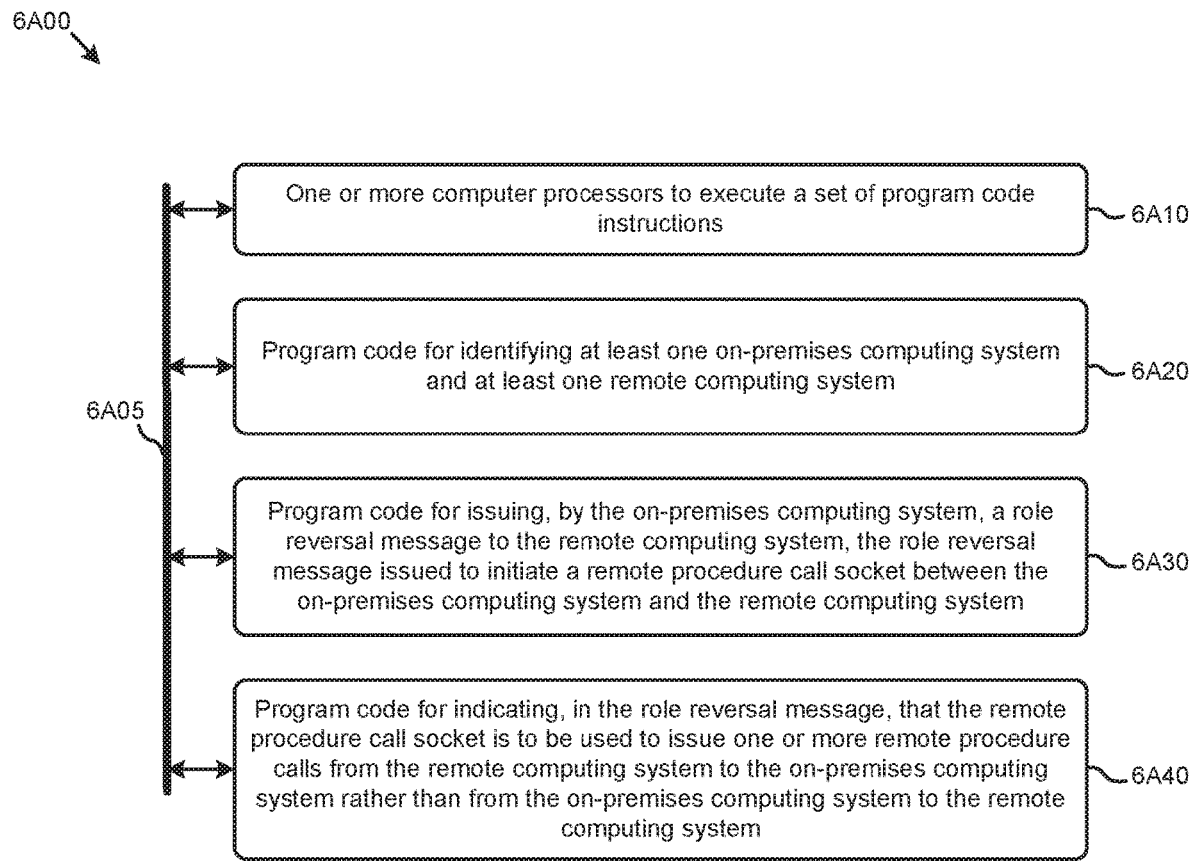
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently restoring disaster recovery data from a remote computing system. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising a computer processor to execute a set of program code instructions (module 6A10) and modules for accessing memory to hold program code instructions to perform: identifying at least one on-premises computing system and at least one remote computing system (module 6A20); issuing, by the on-premises computing system, a role reversal message to the remote computing system, the role reversal message issued to initiate a remote procedure call socket between the on-premises computing system and the remote computing system (module 6A30); and indicating, in the role reversal message, that the remote procedure call socket is to be used to issue one or more remote procedure calls from the remote computing system to the on-premises computing system rather than from the on-premises computing system to the remote computing system (module 6A40).

Variations of the foregoing may include more or fewer of the shown modules. Certain variations may perform more or fewer (or different) steps and/or certain variations may use data elements in more or in fewer (or different) operations.

Figure 6B:
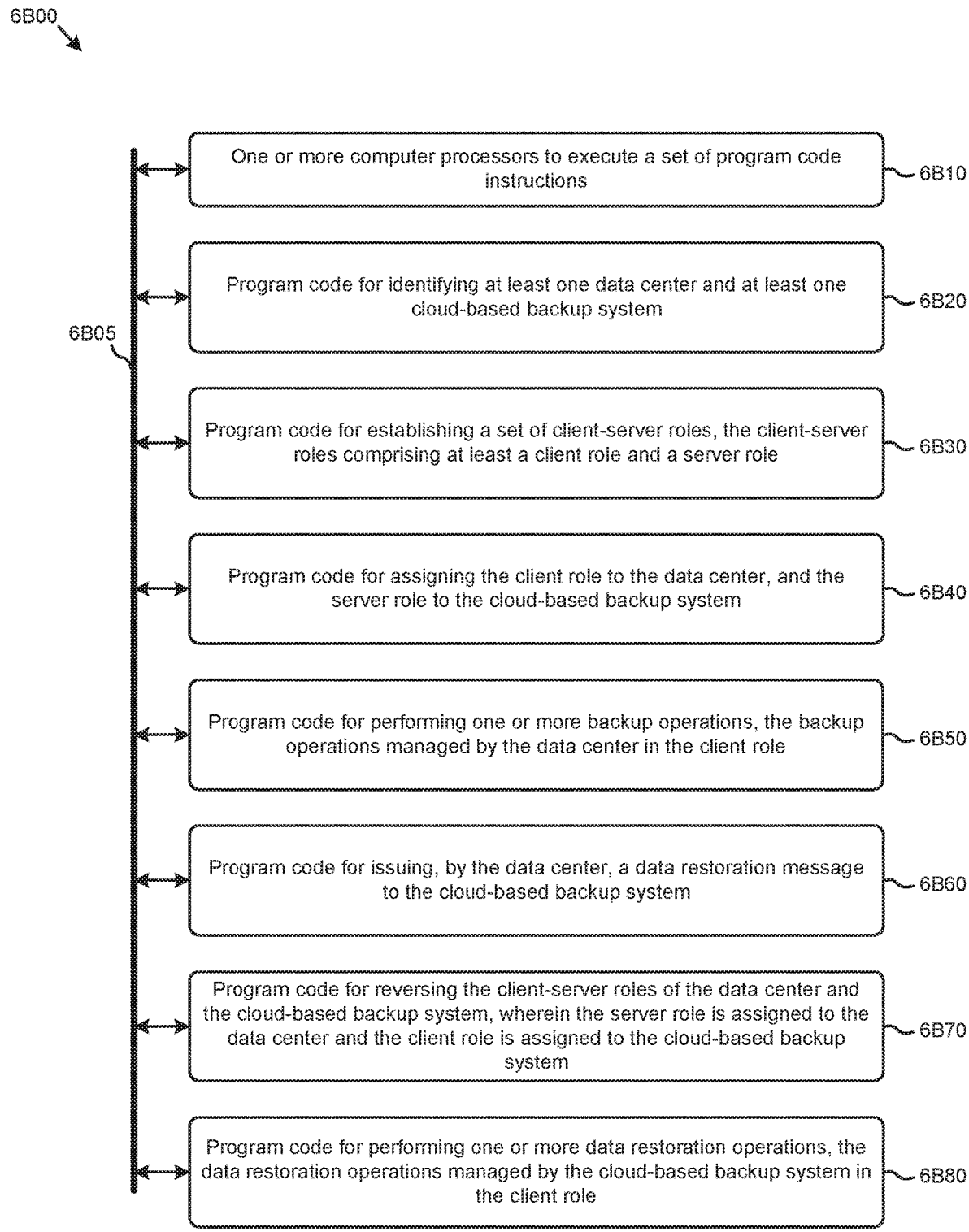

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment.

The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05 so as to achieve communication socket role reversal. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising a computer processor to execute a set of program code instructions (module 6B10) and modules for accessing memory to hold program code instructions to perform: identifying at least one data center and at least one cloud-based backup system (module 6B20); establishing a set of client-server roles, the client-server roles comprising at least a client role and a server role (module 6B30); assigning the client role to the data center, and the server role to the cloud-based backup system (module 6B40); performing one or more backup operations, the backup operations managed by the data center in the client role (module 6B50); issuing, by the data center, a data restoration message to the cloud-based backup system (module 6B60); reversing the client-server roles of the data center and the cloud-based backup system, wherein the server role is assigned to the data center and the client role is assigned to the cloud-based backup system (module 6B70); and performing one or more data restoration operations, the data restoration operations managed by the cloud-based backup system in the client role (module 6B80).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 7A:
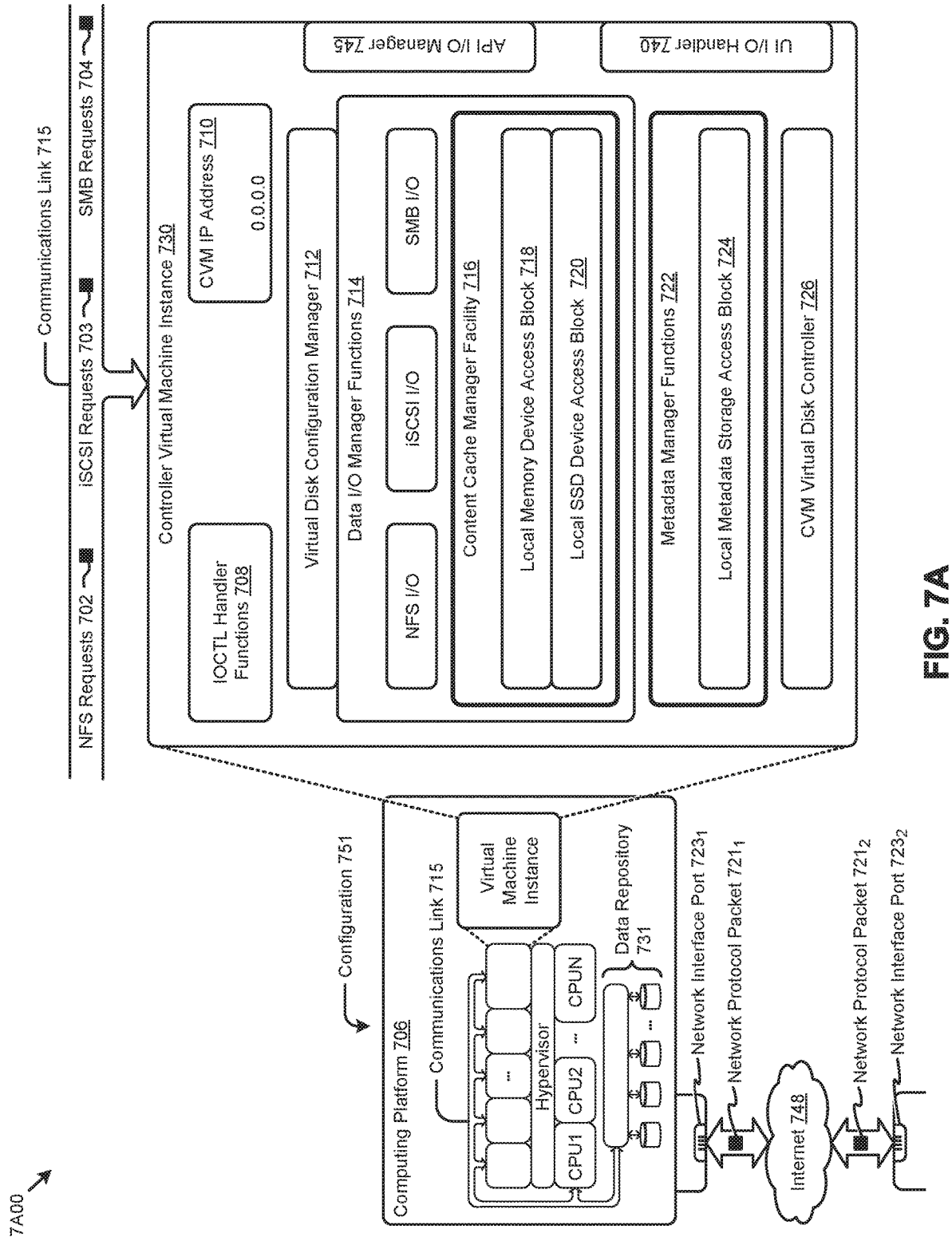
FIG. 7A, FIG. 7B, and FIG. 7C depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output (I/O or IO) can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). External data repository 731 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 724. External data repository 731 can be configured using CVM virtual disk controller 726, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program code instructions (e.g., application code) communicated through the Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or the results of executing program code can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to efficient data restoration from a remote computing system. In some embodiments, a module may include one or more state machines and/or combinational logic used to implement or facilitate the operational and/or performance characteristics pertaining to efficient data restoration from a remote computing system.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of efficient data restoration from a remote computing system). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to restoration from a remote computing system, and/or for improving the way data is manipulated when performing computerized operations pertaining to establishing, by an on-premises computing system, a reverse connection resource with a remote computing system that facilitates data restoration operations invoked from the remote computing system.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
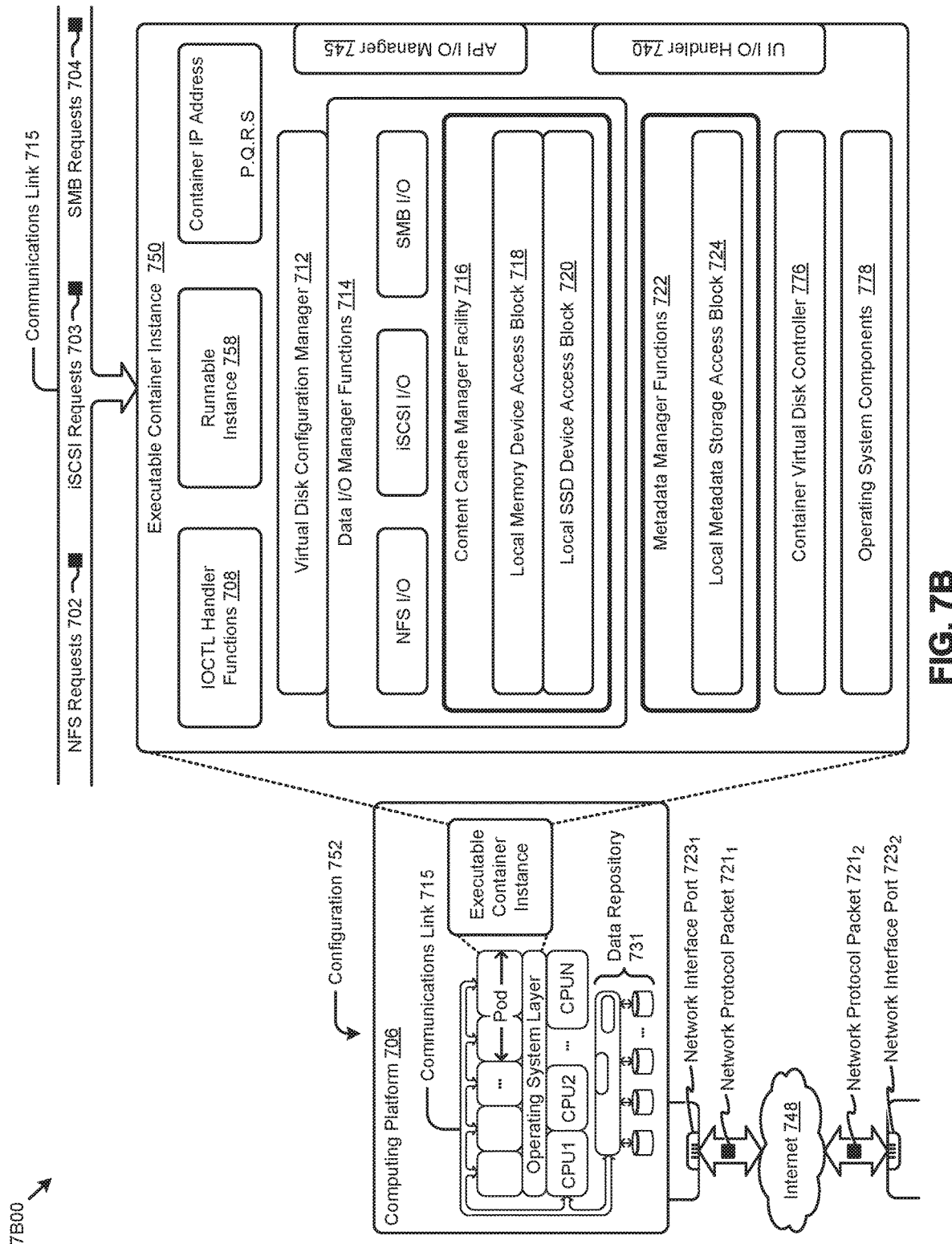

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
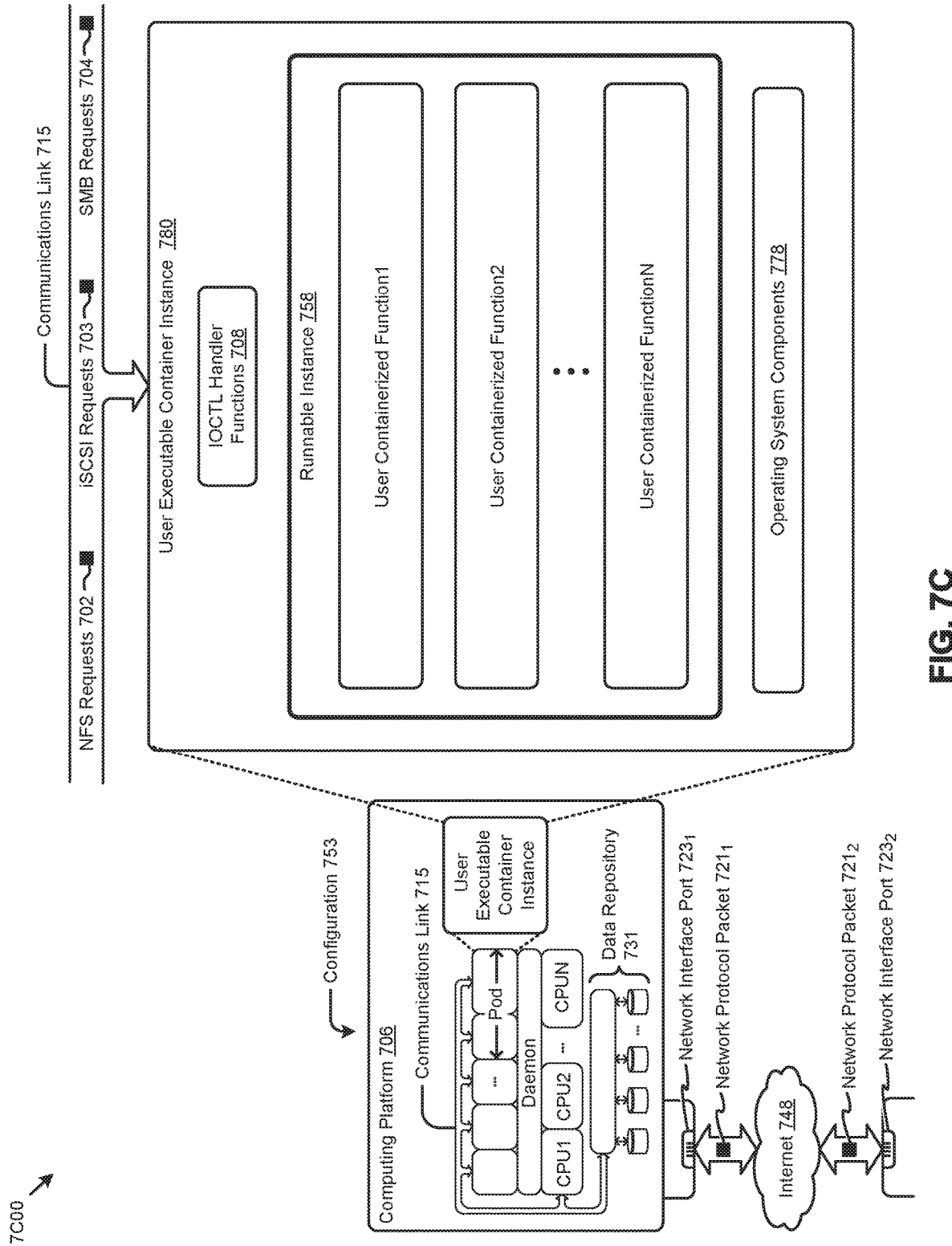

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 780. Configuration 753 includes a daemon layer (as shown) that performs certain functions of an operating system.

User executable container instance 780 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 780.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    assigning a remote procedure call client role to a data center, and a remote procedure call server role to a cloud-based backup system;
    performing a backup operation from the data center to the cloud-based backup system, the backup operation managed by the data center in the remote procedure call client role;
    reversing client-server roles of the data center and the cloud-based backup system, wherein the remote procedure call server role is assigned to the data center and the remote procedure call client role is assigned to the cloud-based backup system; and
    performing a system restoration operation from the cloud-based backup system to the data center, the system restoration operation performed by the cloud-based backup system in the remote procedure call client role.

2. The method of claim 1, wherein reversing client-server roles of the data center and the cloud-based backup system is performed as a result of at least a data restoration message from the data center that comprises a request to the cloud-based backup system to establish a reverse RPC connection.

3. The method of claim 2, further comprising indicating in a data structure of the cloud-based backup system that the reverse RPC connection is for a remote procedure call from the cloud-based backup system to the data center.

4. The method of claim 2, wherein the data restoration message or a message subsequent to the data restoration message comprises at least one of, an authentication credential, or a key.

5. The method of claim 2, wherein the system restoration operation comprises sending restore data from the cloud-based backup system to the data center over the reverse RPC connection.

6. A non-transitory computer readable medium having stored thereon a sequence of instructions which, when executed by a processor causes a set of acts, the set of acts comprising:

assigning a remote procedure call client role to a data center, and a remote procedure call server role to a cloud-based backup system;

performing a backup operation from the data center to the cloud-based backup system, the backup operation managed by the data center in the remote procedure call client role;

reversing client-server roles of the data center and the cloud-based backup system, wherein the remote procedure call server role is assigned to the data center and the remote procedure call client role is assigned to the cloud-based backup system; and performing a system restoration operation from the cloud-based backup system to the data center, the system restoration operation performed by the cloud-based backup system in the remote procedure call client role.

7. The computer readable medium of claim 6, wherein reversing client-server roles of the data center and the cloud-based backup system is performed as a result of at least a data restoration message from the data center that comprises a request to the cloud-based backup system to establish a reverse RPC connection.

8. The computer readable medium of claim 7, wherein the set of acts further comprise indicating in a data structure of the cloud-based backup system that the reverse RPC connection is for a remote procedure call from the cloud-based backup system to the data center.

9. The computer readable medium of claim 7, wherein the data restoration message or a message subsequent to the data restoration message comprises at least one of, an authentication credential, or a key.

10. The computer readable medium of claim 7, wherein the system restoration operation comprises sending restore data from the cloud-based backup system to the data center over the reverse RPC connection.

11. A system for efficient system restoration, the comprising:

a storage medium having stored thereon a sequence of instructions; and a processor that executes the sequence of instructions to cause a set of acts comprising:

assigning a remote procedure call client role to a data center, and a remote procedure call server role to a cloud-based backup system;

performing a backup operation from the data center to the cloud-based backup system, the backup operation managed by the data center in the remote procedure call client role;

reversing client-server roles of the data center and the cloud-based backup system, wherein the remote procedure call server role is assigned to the data center and the remote procedure call client role is assigned to the cloud-based backup system; and performing a system restoration operation from the cloud-based backup system to the data center, the system restoration operation performed by the cloud-based backup system in the remote procedure call client role.

12. The system of claim 11, wherein reversing client-server roles of the data center and the cloud-based backup system is performed as a result of at least a data restoration message from the data center that comprises a request to the cloud-based backup system to establish a reverse RPC connection.

13. A non-transitory computer readable medium having stored thereon a sequence of instructions which, when executed by a processor causes a set of acts, the set of acts comprising:

performing a backup operation from a second computing system to a first computing system, the backup operation managed by the second computing system in a client role for an existing remote procedure call connection;

identifying a role reversal triggering event at the first computing system, the first computing system having a server role for the existing remote procedure call connection;

issuing, by the first computing system, a role reversal message to the second computing system, the role reversal message specifying that the second computing system change its role to the server role for the existing remote procedure call connection between the first computing system and the second computing system, wherein the second computing system uses the existing remote procedure connection to issue a remote procedure call from the second computing system to the first computing system after the role reversal message; and performing a system restoration operation from the first computing system to the second computing system, the system restoration operation performed by the first computing system in the remote procedure call client role.

14. The computer readable medium of claim 13, wherein the role reversal message comprises at least one of, server information corresponding to a server at the first computing system, or a set of an access credential corresponding to the server.

15. The computer readable medium of claim 14, wherein the remote procedure call is formatted based at least in part on at least one of, the server information, or the access credential.

16. The computer readable medium of claim 14, wherein the remote procedure call from the second computing system to the first computing system is authorized based at least in part on at least one of, the server information, or the access credential.

17. The computer readable medium of claim 14, wherein the remote procedure call performs at least one of, a system restoration operation, a failback restoration operation, a disaster recovery operation, a data replication operation, or a backup operation.

18. The computer readable medium of claim 14, wherein the role reversal message is issued in response to a system restoration event.

19. The computer readable medium of claim 14, wherein the second computing system is a cloud-based computing system accessed through a public cloud.

20. The computer readable medium of claim 14, wherein the first computing system is protected by a firewall.

21. The system of claim 12, wherein the set of acts further comprise indicating in a data structure of the cloud-based backup system that the reverse RPC connection is for a remote procedure call from the cloud-based backup system to the data center.

22. The system of claim 12, wherein the data restoration message or a message subsequent to the data restoration message comprises at least one of, an authentication credential, or a key.

23. The system of claim 12, wherein the system restoration operation comprises sending restore data from the cloud-based backup system to the data center over the reverse RPC connection.

24. The system of claim 12, wherein the reverse RPC connection is established by repurposing an existing RPC connection.

25. The method of claim 2, wherein the reverse RPC connection is established by repurposing an existing RPC connection.

26. The computer readable medium of claim 7, wherein the reverse RPC connection is established by repurposing an existing RPC connection.

27. A non-transitory computer readable medium having stored thereon a sequence of instructions which, when executed by a processor causes a set of acts, the set of acts comprising:
    initiating, at a data center, a connection between the data center and a cloud-based backup system, the data center having a client role, and the cloud-based backup system having a server role, wherein the cloud-based backup system is protected by a firewall;
    performing a backup operation from the data center to the cloud-based backup system, the backup operation managed by the data center in the client role;
    reversing client-server roles of the data center and the cloud-based backup system, wherein the server role is assigned to the data center and the client role is assigned to the cloud-based backup system; and
    performing a system restoration operation from the cloud-based backup system to the data center, the system restoration operation performed by the cloud-based backup system in the client role.

28. The computer readable medium of claim 27, wherein reversing client-server roles of the data center and the cloud-based backup system is performed as a result of at least a data restoration message from the data center that comprises a request to the cloud-based backup system to establish a reverse remote procedure call (RPC) connection, and the set of acts further comprise indicating in a data structure of the cloud-based backup system that the reverse RPC connection is for a RPC from the cloud-based backup system to the data center.

29. The computer readable medium of claim 27, wherein reversing client-server roles repurposes an existing remote procedure call (RPC) connection using a role reversal message specifying that the cloud-based backup system change its role to the server role for the existing RPC connection between the data center and the cloud-based backup system, wherein the cloud-based backup system uses the existing RPC connection to issue a RPC from the cloud-based backup system to the data center after the role reversal message.

30. The computer readable medium of claim 27, wherein reversing client-server roles of the data center and the cloud-based backup system is performed as a result of at least a data restoration message from the data center that comprises a request to the cloud-based backup system to establish a reverse RPC connection, wherein the data restoration message or a message subsequent to the data restoration message comprises at least one of, an authentication credential, or a key.

31. The computer readable medium of claim 27, wherein the system restoration operation comprises sending restore data from the cloud-based backup system to the data center over the connection.

* * * * *